United States Patent Office 3,538,026
Patented Nov. 3, 1970

3,538,026
PROCESS FOR PREPARING A STAIN-RESISTANT MOLDING COMPOSITION COMPRISING DRY BLENDING MELAMINE PER SE AND MELAMINE-FORMALDEHYDE MOLDING POWDER
Norman W. Standish, Shaker Heights, and Richard W. Yanik, North Randall, Ohio, assignors to The Standard Oil Company, Cleveland, Ohio, a corporation of Ohio
No Drawing. Filed Dec. 30, 1968, Ser. No. 788,022
Int. Cl. C08g 9/30, 51/18
U.S. Cl. 260—17.3                              4 Claims

ABSTRACT OF THE DISCLOSURE

A stain-resistant melamine-formaldehyde molding composition and stain-resistant molded articles manufactured therefrom are prepared by dry-blending certain quantities of melamine into a conventional melamine-formaldehyde molding powder prior to the molding operation.

This invention relates to a novel process for preparing a molding composition and to the preparation of stain-resistant molded articles therefrom. More particularly, this invention relates to a melamine-formaldehyde molding compound in admixture with certain quantities of melamine per se and to the process for preparing the same.

Staining and loss of luster of melamine dinnerware has been a limiting factor in the wide acceptance of this product in dinnerware markets. Heretofore, in producing stain-resistant melamine dinnerware, the traditional approach has been to modify the composition of the polymer chain during the resin production as in, for example, U.S. Pat. No. 2,579,985. In this process, melamine and the stain-resistant component benzoguanamine are coreacted with formaldehyde to produce a resin with increased stain resistance over that of a melamine-formaldehyde molding resin.

U.S. Pat. No. 3,367,917 discloses a process for preparing a stain-resistant molding composition by incorporating benzoguanamine crystals into a melamine-benzoguanamine-formaldehyde resin having a quantity of benzoguanamine in the resin syrup less than that amount ultimately desired. In this process, a component known to impart stain resistance in a molding resin is added to the resin already containing the same stain-resistant component.

We have discovered a method for producing a stain-resistant melamine molding composition in which no attempt is made to modify the aqueous melamine-formaldehyde resin composition but involves the formation of a physical mixture of melamine into a conventional melamine-formaldehyde molding powder. The melamine is dry-blended into the melamine-formaldehyde molding powder prior to the molding operation. Under heat and pressure of the molding operation the melamine is believed to be incorporated into the chemical structure of the melamine-formaldehyde resin by means of a surface polymerization reaction, thereby modifying the properties of the plastic surface. Only very minor amounts of the melamine additive are required to produce the desired effect as compared with the much larger amounts of polymer chain modifiers required in the prior art processes.

It is believed that the melamine additive is chemically incorporated in the melamine-formaldehyde folding resin at terminal fucntional groups rather than included in a random fashion throughout the polymer chain in the final molding operation. Thus, the usual problems associated with color drift, long cure times and heat stability in melamine molding compounds are minimized.

The molding compounds of this invention are particularly resistant to staining by exposure to coffee and tea, and the molded articles made from these resins have excellent surface smoothness and gloss. Additionally, the melamine molding compounds of this invention have no noticeable sensitivity toward ultraviolet light, a problem often associated with stain-resistant melamine-formaldehyde resins containing benzoguanamine due to their tendency to develop a yellow coloration on prolonged exposure to ultraviolet light.

Obtaining stain resistance by adding melamine to a stain-susceptible, conventional melamine-formaldehyde molding powder in the manner of this invention is surprising in view of the fact that by initially reacting the same total amount of melamine with the formaldehyde in the usual manner does not result in a stain-resistant molding resin. Therefore, the improvement in stain resistance is not due merely to an increase in the overall concentration of melamine in the formulation but is due to some modification of the surface properties of the molded article by means of the process of this invention. It is also very surprising that a stain-resistant molding composition can be obtained by adding subsequently, small amounts of one of the components originally present in a stain-susceptible molding formulation. The melamine-formaldehyde molding resins prepared by this process also exhibit improved melt flow properties.

Satisfactory stain-resistant molding compositions can be prepared by incorporating from about 1–40% by weight and preferably from about 3–30% by weight of melamine, based on the total composition of the molding powder, into a standard melamine-formaldehyde molding powder. More than theoretical amounts of melamine can be dry-blended into the melamine-formaldehyde pre-polymer and still obtain satisfactory molded articles by proportionately increasing the concentration of curing catalyst employed. These molding powders, however, are much more fluid in the melt stage than those containing less melamine and are, therefore, suited to processing by injection molding as well as by compression molding. Although excellent stain resistance is obtained with low concentration of added melamine, certain economic advantages are to be gained with resins of higher melamine content.

In preparing the melamine-formaldehyde resins of this invention, a commercial aqueous solution of formaldehyde containing 37% formaldehyde by weight is reacted with melamine in a molar ratio of about 1:1 to 3:1. The mixture is stirred and the pH of the mixture is adjusted to between 8 and 10 with a base such as sodium hydroxide or ammonium hydroxide. The mixture is heated to reflux until a syrup is formed.

The molding compound is prepared from this syrup by adding a conventional filler such as clay, asbestos, paper, fiber, etc., and preferably alpha-cellulose in amounts ranging from 20–70 parts per 100 parts of resin. After thorough blending, the impregnated filler is dried and conventional pigments, curing catalysts, mold-release agents and brighteners are added.

The drying step is accomplished in a continuous type oven where the impregnated filler travels through an oven on a belt and is contacted with hot air at about 180–210° F. to remove moisture. The resin is obtained from the oven in a coarse granular form referred to as "popcorn." The "popcorn" granules are reduced in size by passing through a pregrinder. To this finer granular material are added the aforementioned additives, the pigments, curing catalyst, mold-release agent, brightener and the like. At this point, the desired amount of the stain-resistant additive is likewise incorporated. These materials are uniformly dispersed and blended into the resin substrate by ball milling, high-speed mixing, as in a Prodex Henschel mixer, etc. Ball milling, which is used most frequently, is carried out in a rotatable drum-like apparatus which contains flint or porcelain balls of the same or varying diameters. The ground product is then molded into various shapes by subjecting the resin to temperatures of from 250–375° F. and pressures of from 1400–4000 p.s.i. for a period of one to ten minutes.

In order that the present invention may be more completely understood, the following examples illustrate in greater detail the various steps of the process. These examples, however, are set forth primarily for the purpose of illustration and are not to be interpreted as limitations of the invention.

EXAMPLE 1

The preparation of standard melamine-formaldehyde molding powder is carried out as follows:

756 parts (6 moles) of melamine and 1362 parts (16 moles) of 37% aqueous formaldehyde solution were introduced into a reaction vessel equipped with a reflux condenser, thermometer, and stirrer. The mixture was stirred for several minutes to break up aggregated material and to form a uniform dispersion of the melamine throughout the mixture. The pH of the mixture was adjusted to 8.0 (glass electrode at 25° C.) using 1 N sodium hydroxide The reaction mixture was then heated to reflux and reflux continued until one drop of the clear resin hydrophobed (Encyclopedia of Polymer Science and Technology, volume 2, page 30) in 25 cc. of water (25° C.). The resin was cooled, added to 582 grams of alpha-cellulose and mixed by hand until no free resin syrup remained. The product was then mixed in a sigma blade mixer for a period of one hour.

The alpha-cellulose resin mixture was dried in an air stream for one hour at 190° F. and 18% relative humidity. The resulting dried product was ground on a screen mill to produce a powder in which the maximum particle size was less than 800 microns. The ground powder, along with 0.5 part of zinc stearate, 0.5 part of rutile titanium dioxide and 0.13% phthalic anhydride were milled in a ball mill for five hours. At this point, other pigments, dyes, and additives for flow and mold release were added. The resin was then molded at a pressure of 3000 p.s.i. and at a temperature of 175° C. for a period of three minutes.

EXAMPLES 2–6

The method of preparation in Example 1 was repeated with the exception that the various amounts of additional melamine indicated in Table I were added to the ground and screened powder just previous to the ball-milling operation.

TABLE I.—EFFECT OF ADDED MELAMINE ON STAIN RESISTANCE
[Melamine milled into standard melamine-formaldehyde molding powder]

| Example | Weight percent melamine added | Yellowness index ratio [1] | Stain rating (visual) |
|---|---|---|---|
| 1 | 0 | 1.19 | 10+ |
| 2 | 1 | 0.89 | 9 |
| 3 | 2½ | 0.87 | 8 |
| 4 | 3 | 0.87 | 8 |
| 5 | 5 | 0.62 | 4 |
| 6 | 10 | 0.81 | 6 |
| 7 | 25 | 0.78 | 6 |
| 8 | 35 | 0.81 | 6 |
| 9 | [2] 5 | 1.13 | 10+ |

[1] $\frac{\text{Yellowness index of sample}}{\text{Yellowness index of control}}$ = yellowness index ratio.

[2] Added to resin phase.

EXAMPLES 7 AND 8

The method employed in preparing Examples 2–6 was repeated with the exception that the amount of curing catalyst employed was increased from 0.13% by weight to 0.50% by weight. (See Table I for stain-resistant properties.)

EXAMPLE 9

The same procedure of Example 1 was followed with the exception that 846 parts (6.7 moles) of melamine were reacted with 1362 parts (16 moles) of aqueous formaldehyde. (See Table I for stain-resistant properties.)

The stain-resistant properties of Examples 1–9 given in Table I were measured by the test methods described below.

The coffee-stain test consisted of adding 454 parts of powdered coffee to one gallon of water and the mixture was brought to a boil. The melamine resin molded test pieces were suspended in the solution so that they were totally immersed. Fresh coffee solution was used for each test series. In every case, a melamine resin molded sample prepared from standard molding powder was included with each test. The test pieces remained in the boiling coffee solution for a period of eight hours and for sixteen additional hours as the solution cooled to room temperature. They were then washed with a mild detergent and dried.

In one test the samples were rated visually according to a scale ranging from 1 to 10. On this scale a sample exhibiting no staining was given a rating of 1 and the degree of staining obtained on standard nonstain resistant melamine molding powder was 10. Any composition which was poorer than standard melamine molding powder was rated as 10+ and no attempt was made to determine the relative degree of staining.

These ratings were compared with ratings obtained in the Yellowness Index test, measured according to the ASTM procedure D1925–62T. In this test the degree of yellowing was determined under daylight illumination on a Hunter Color Instrument, Model D–25, Hunter Associates, McLean, Va. The degree of staining was determined relative to a standard which in these tests consisted of a sample of standard melamine resin molded articles exposed to the same coffee-stain solution concurrently with the test sample. The deviation in color from the standard in the wavelength range of from 570–575 millimicrons was determined.

The improvement in stain resistance of a standard melamine-formaldehyde molding powder by addition of the melamine in the manner of this invention is demonstrated by the example given in Table I. Example 9 shows that no improvement in stain resistance is obtained by incorporating the additional melamine into the melamine-formaldehyde reaction mixture where it is completely reacted with the formaldehyde in the aqueous resin stage.

We claim:
1. A process for manufacturing a stain-resistant molding composition comprising:
   (a) combining a fibrous filler with a resinous syrup of a condensate of formaldehyde and melamine,
   (b) drying the combined material from (a), and
   (c) adding the homogenizing additional melamine with the dried material from (b) said melamine being incorporated in amounts ranging from about 1–40% by weight based on the total weight of the molding composition.
2. The process of claim 1 wherein step (c) is carried out in a ball mill.
3. A stain-resistant molded article prepared by:
   (a) combining a fibrous filler with a resinous syrup of a condensate of formaldehyde and melamine,
   (b) drying the combined material from (a),
   (c) adding and homogenizing additional melamine with the dried material from (b) said melamine being incorporated in amounts ranging from about 1–40% by weight based on the total weight of the molding composition, and

(d) molding the material from (c) at an elevated temperature and pressure.

4. The stain-resistant molded article of claim 3, wherein step (c) is carried out in a ball mill.

References Cited

UNITED STATES PATENTS

| 2,864,779 | 12/1958 | Bihan et al. | 260—17.3 |
| 3,044,973 | 7/1962 | Segro et al. | 260—17.3 |
| 3,230,187 | 1/1966 | Oldham | 260—17.3 |
| 3,367,917 | 2/1968 | Granito | 260—67.6 |

WILLIAM H. SHORT, Primary Examiner

E. WOODBERRY, Assistant Examiner

U.S. Cl. X.R.

260—39, 67.6